(12) United States Patent
Aronovich

(10) Patent No.: US 10,229,132 B2
(45) Date of Patent: Mar. 12, 2019

(54) OPTIMIZING DIGEST BASED DATA MATCHING IN SIMILARITY BASED DEDUPLICATION

(71) Applicant: INTERNATIONAL BUSINESS MACHINES CORPORATION, Armonk, NY (US)

(72) Inventor: Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 415 days.

(21) Appl. No.: 13/941,896

(22) Filed: Jul. 15, 2013

(65) Prior Publication Data
US 2015/0019506 A1    Jan. 15, 2015

(51) Int. Cl.
*G06F 17/30* (2006.01)

(52) U.S. Cl.
CPC .............................. *G06F 17/30156* (2013.01)

(58) Field of Classification Search
CPC ................................................ G06F 17/30156
USPC ......................................................... 707/692
See application file for complete search history.

(56) References Cited

U.S. PATENT DOCUMENTS

| | | | |
|---|---|---|---|
| 5,990,810 A * | 11/1999 | Williams | ............... G06F 3/0608 341/51 |
| 6,009,432 A | 12/1999 | Tarin | |
| 6,810,398 B2 | 10/2004 | Moulton | |
| 7,523,098 B2 | 4/2009 | Hirsch et al. | |
| 7,694,191 B1 | 4/2010 | Bono et al. | |
| 8,108,353 B2 | 1/2012 | Balachandran et al. | |
| 8,200,923 B1 | 6/2012 | Healy et al. | |
| 8,224,848 B2 | 7/2012 | McCreight et al. | |
| 8,234,468 B1 * | 7/2012 | Deshmukh | .......... G06F 11/1453 711/162 |
| 8,285,957 B1 | 10/2012 | Yasa et al. | |
| 8,412,848 B2 | 4/2013 | Therrien et al. | |
| 8,484,152 B2 | 7/2013 | Hoglund | |
| 8,769,689 B2 | 7/2014 | Hoglund | |
| 8,832,035 B2 | 9/2014 | Raj et al. | |
| 8,918,390 B1 | 12/2014 | Shilane et al. | |
| 9,294,501 B2 | 3/2016 | Mesdaq et al. | |

(Continued)

FOREIGN PATENT DOCUMENTS

| | | |
|---|---|---|
| CN | 102811213 A | 12/2012 |
| EP | 1962209 A2 | 8/2008 |

(Continued)

OTHER PUBLICATIONS

Anonymous; "Framework for Stream De-duplication using Biased Reservoir-Sampling"; http://priorartdatabase.com/IPCOM/000216344; Mar. 31, 2012.

(Continued)

*Primary Examiner* — Syling Yen
(74) *Attorney, Agent, or Firm* — Griffiths & Seaton PLLC

(57) ABSTRACT

Data matches are calculated between input data and repository data via a digest based matching algorithm where in a first step digest matches, anchored at already verified matching positions in the input data and in the repository data, are extended to produce data matches. In a second step the remaining unmatched input digests are matched with repository digests and extended to produce further data matches.

21 Claims, 7 Drawing Sheets

(56) References Cited

U.S. PATENT DOCUMENTS

| | | |
|---|---|---|
| 2007/0005556 A1 | 1/2007 | Ganti et al. |
| 2008/0013830 A1 | 1/2008 | Patterson et al. |
| 2008/0294696 A1* | 11/2008 | Frandzel ............... G06F 3/0608 |
| 2009/0307251 A1 | 12/2009 | Heller et al. |
| 2010/0088277 A1 | 4/2010 | Rao et al. |
| 2010/0088349 A1 | 4/2010 | Parab |
| 2010/0198797 A1 | 8/2010 | Wideman |
| 2010/0318515 A1* | 12/2010 | Ramanathan et al. ........ 707/723 |
| 2011/0016095 A1 | 1/2011 | Anglin et al. |
| 2011/0185417 A1 | 7/2011 | Zhou et al. |
| 2011/0276781 A1 | 11/2011 | Sengupta et al. |
| 2011/0296133 A1 | 12/2011 | Flynn et al. |
| 2012/0023070 A1 | 1/2012 | Prahlad et al. |
| 2012/0023112 A1 | 1/2012 | Levow et al. |
| 2012/0143835 A1* | 6/2012 | Aronovich .......... G06F 11/1453 707/696 |
| 2012/0159098 A1 | 6/2012 | Cheung et al. |
| 2012/0166401 A1 | 6/2012 | Li et al. |
| 2012/0166448 A1* | 6/2012 | Li ..................... G06F 17/30097 707/747 |
| 2012/0215789 A1 | 8/2012 | Ramanathan et al. |
| 2012/0226697 A1 | 9/2012 | Chang et al. |
| 2012/0239625 A1 | 9/2012 | Arnovich et al. |
| 2012/0259825 A1 | 10/2012 | Tashiro et al. |
| 2013/0018854 A1 | 1/2013 | Condict |
| 2013/0018932 A1* | 1/2013 | Bhaskar et al. .............. 708/203 |
| 2013/0198459 A1 | 8/2013 | Joshi et al. |
| 2014/0040616 A1* | 2/2014 | Barber ................ G06F 11/1453 713/168 |
| 2014/0046909 A1* | 2/2014 | Patiejunas ......... G06F 17/30289 707/687 |
| 2014/0188822 A1 | 7/2014 | Das |
| 2015/0033120 A1 | 1/2015 | Cooke et al. |

FOREIGN PATENT DOCUMENTS

| | | |
|---|---|---|
| WO | 2012092348 A2 | 7/2012 |
| WO | 2012158654 A2 | 11/2012 |

OTHER PUBLICATIONS

Bhagwat, D. et al.; "Extreme Binning: Scalable, Parallel De-duplication for Chunk-based File Backup"; Proceedings of the 17th IEEE/ACM International Symposium on Modeling, Analysis and Simulation of Computer and Telecommunication Systems (MAS-COTS'2009), London, UK, Sep. 2009.

Zhu, B., Li, K., and Patterson, H., "Avoiding the disk bottleneck in the Data Domain deduplication file system", In Proceedings of the 6th USENIX Conference on File and Storage Technologies (FAST) (San Jose, CA, USA, Feb. 2008), USENIX Association, pp. 269-282.

M. Lillibridge, K. Eshghi, D. Bhagwat, V. Deolalikar, G. Trezise, and P. Campbell, "Sparse Indexing: Large scale, inline deduplication using sampling and locality", in Proceedings of the Eighth USENIX Conference on File and Storage Technologies (FAST), Feb. 2009, pp. 111-123.

Bartłomiej Romański, Łukasz Heldt, Wojciech Kilian, Krzysztof Lichota, and Cezary Dubnicki, "Anchor-driven subchunk deduplication", In Proceedings of the 4th Annual International Conference on Systems and Storage (SYSTOR '11). ACM, New York, NY, USA, Article 16 , 13 pages.

Muthitacharoen, A., Chen, B., and Mazi`eres, D. "A low-bandwidth network file system". In Proceedings of the 18th ACM Symposium on Operating Systems Principles (SOSP) (Banff, Alberta, Canada, Oct. 2001), ACM Press, pp. 174-187.

Cai Bo, Zhang Feng Li, Wang Can. "Research on Chunking Algorithms of Data De-Duplication". American Journal of Engineering and Technology Research vol. 11, No. 9, 2011.

\* cited by examiner

OPTIMIZING DIGEST BASED DATA MATCHING IN SIMILARITY BASED DEDUPLICATION

CROSS REFERENCE TO RELATED APPLICATIONS

The present application, listed as U.S. application Ser. No. 13/941,896, is cross-related to the following seventeen applications each listed as: U.S. application Ser. No. 13/941,703, U.S. application Ser. No. 13/941,873, U.S. application Ser. No. 13/941,694, U.S. application Ser. No. 13/941,886, U.S. application Ser. No. 13/941,782, U.S. application Ser. No. 13/941,951, U.S. application Ser. No. 13/941,711, U.S. application Ser. No. 13/941,958, U.S. application Ser. No. 13/941,714, U.S. application Ser. No. 13/941,742, U.S. application Ser. No. 13/941,769, U.S. application Ser. No. 13/942,009, U.S. application Ser. No. 13/941,982, U.S. application Ser. No. 13/941,800, U.S. application Ser. No. 13/941,999, U.S. application Ser. No. 13/942,027, and U.S. application Ser. No. 13/942,048, all of which are filed on the same day as the present invention, Jul. 15, 2013, and the entire contents of which are incorporated herein by reference and are relied upon for claiming the benefit of priority.

BACKGROUND OF THE INVENTION

Field of the Invention

The present invention relates in general to computers, and more particularly to optimizing digest based data matching in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for optimizing digest based data matching in a data deduplication system using a processor device in a computing environment. In one embodiment, by way of example only, data matches are calculated between input data and repository data via a digest based matching algorithm where in a first step digest matches, anchored at already verified matching positions in the input data and in the repository data, are extended to produce data matches. In a second step the remaining unmatched input digests are matched with repository digests and extended to produce further data matches.

In another embodiment, a computer system is provided for optimizing digest based data matching in a data deduplication system using a processor device, in a computing environment. The computer system includes a computer-readable medium and a processor in operable communication with the computer-readable medium. In one embodiment, by way of example only, the processor calculates data matches between input data and repository data via a digest based matching algorithm where in a first step digest matches, anchored at already verified matching positions in the input data and in the repository data, are extended to produce data matches. In a second step the remaining unmatched input digests are matched with repository digests and extended to produce further data matches.

In a further embodiment, a computer program product is provided for optimizing digest based data matching in a data deduplication system using a processor device, in a computing environment. The computer-readable storage medium has computer-readable program code portions stored thereon. The computer-readable program code portions include a first executable portion that calculates data matches between input data and repository data via a digest based matching algorithm where in a first step digest matches, anchored at already verified matching positions in the input data and in the repository data, are extended to produce data matches. In a second step the remaining unmatched input digests are matched with repository digests and extended to produce further data matches.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
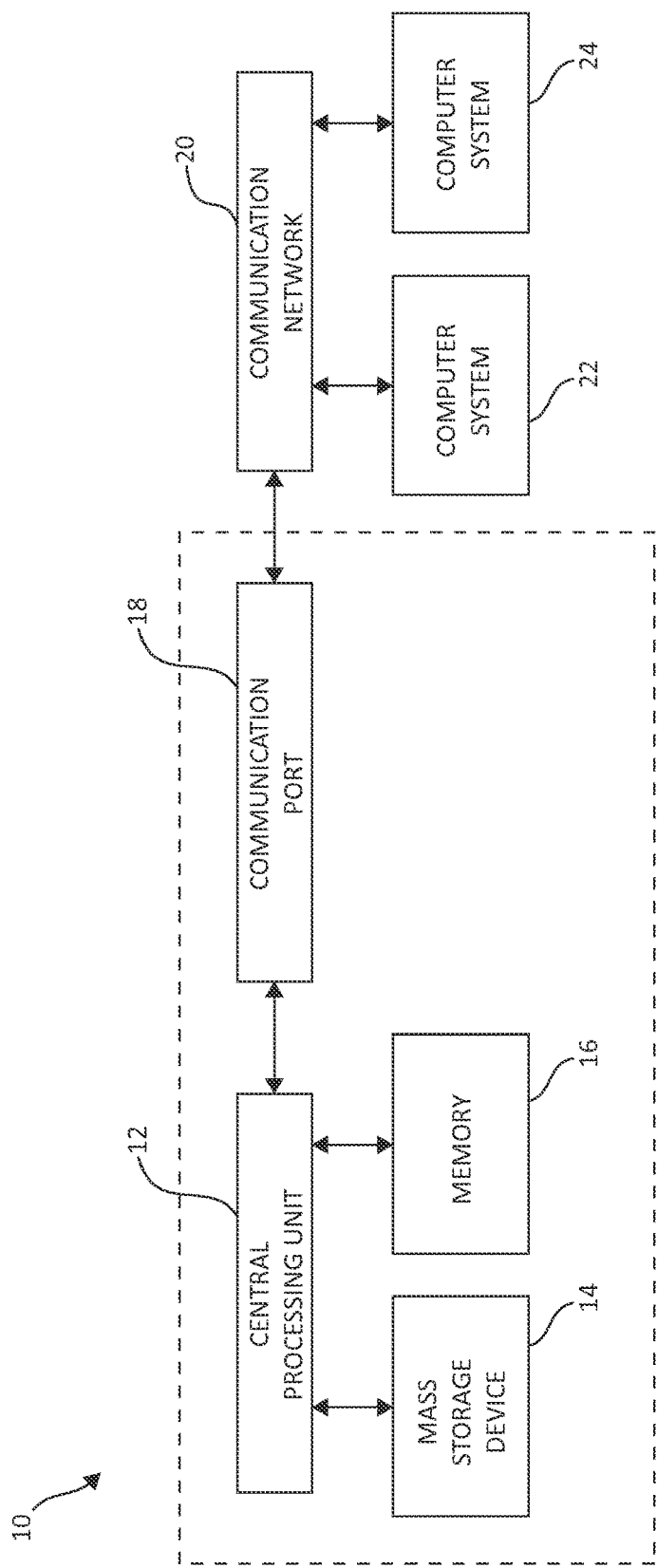
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.). In one embodiment, a deduplication storage system may be based on maintaining a search optimized index of values known as fingerprints or digests, where a (small) fingerprint represents a (larger) block of data in the repository. The fingerprint values may be cryptographic hash values calculated based on the blocks' data. In one embodiment, secure hash algorithm (SHA), e.g. SHA-1 or SHA-256, which are a family of cryptographic hash functions, may be used. Identifying fingerprint matches, using index lookup, enables to store references to data that already exists in a repository. In one embodiment, content defined chunking may be used in for determining segment boundaries where the boundaries are based on the data itself.

To provide reasonable deduplication in this approach, the mean size of the data blocks based on which fingerprints are generated must be limited to smaller sizes and may not be too large. The reason being that a change of a bit within a data block will probabilistically change the data block's corresponding fingerprint, and thus having large data blocks makes the scheme more sensitive to updates in the data as compared to having small blocks. A typical data block size may range from 4 KB to 64 KB, depending on the type of application and workload. Thus, by way of example only, small data blocks may range in sizes of up to 64 KB, and large data blocks are those data blocks having a size larger than 64 KB.

To support very large repositories scaling to Petabytes (e.g., repositories scaling to at least one Petabyte), the number of fingerprints to store coupled with the size of a fingerprint (ranging between 16 bytes and 64 bytes), becomes prohibitive. For example, for 1 Petabyte of deduplicated data, with a 4 KB mean data block size, and 32 bytes fingerprint size (e.g. of SHA-256), the storage required to store the fingerprints is 8 Terabytes. Maintaining a search optimized data structure for such volumes of fingerprints is difficult, and requires optimization techniques. However existing optimization techniques do not scale to these sizes while maintaining performance. For this reason, to provide reasonable performance, the supported repositories have to be relatively small (on the order of tens of TB). Even for such smaller sizes, considerable challenges and run-time costs arise due to the large scale of the fingerprint indexes, that create a bottle-neck (e.g., a chunk look disk bottleneck) in deduplication processing. A solid-state disk (SSD) to cache parts of the index in low persistent memory may be used but such is limited by the size and cost of the SSD.

To solve this problem, in one embodiment, a deduplication system may be based on a two-step approach for searching data patterns during deduplication. In the first step, a large chunk of incoming data (e.g. a few megabytes) is searched in the repository for similar (rather than identical) data chunks of existing data, and the incoming data chunk is partitioned accordingly into intervals and paired with corresponding (similar) repository intervals. In the second step, a byte-wise matching algorithm is applied on pairs of similar intervals, to identify identical sub-intervals, which are already stored in a repository of data. The matching algorithm of the second step relies on reading all the relevant similar data in the repository in order to compare it byte-wise to the input data.

Yet, a problem stemming from a byte-wise comparison of data underlying the matching algorithm of the second step, is that data of roughly the same size and rate as the incoming data should be read from the repository, for comparison purposes. For example, a system processing 1 GB of incoming data per second, should read about 1 GB of data per second from the repository for byte-wise comparison. This requires substantially high capacities of I/O per second of the storage devices storing the repository data, which in turn increases their cost.

Additional trends in information technology coinciding with the above problem are the following: (1) Improvements in the computing ability by increasing CPU speeds and the number of CPU cores. (2) Increase in disk density, while disk throughput remains relatively constant or improving only modestly. This means that there are fewer spindles relative to the data capacity, thus practically reducing the overall throughput. Due to the problem specified above, there is a need to design an alternative solution, to be integrated in a two step deduplication system embodiment specified above, that does not require reading from the repository in high rates/volumes.

Therefore, in one embodiment, by way of example only, additional embodiments address these problems, as well as shifts resource consumption from disks to the CPUs, to benefit from the above trends. The embodiments described herein are integrated within the two-step and scalable deduplication embodiments embodiment described above, and uses a similarity search to focus lookup of digests during deduplication. In one embodiment, a global similarity search is used as a basis for focusing the similarity search for digests of repository data that is most likely to match input data.

The embodiments described herein significantly reduce the capacity of I/O per second required of underlying disks, benefit from the increases in computing ability and in disk density, and considerably reduce the costs of processing, as well as maintenance costs and environmental overhead (e.g. power consumption).

In one embodiment, input data is segmented into small segments (e.g. 4 KB) and a digest (a cryptographic hash value, e.g. SHA1) is calculated for each such segment. First, a similarity search algorithm, as described above, is applied on an input chunk of data (e.g. 16 MB), and the positions of the most similar reference data in the repository are located and found. These positions are then used to lookup the digests of the similar reference data. The digests of all the data contained in the repository are stored and retrieved in a form that corresponds to their occurrence in the data. Given a position of a section of data contained in the repository, the digests associated with the section of data are efficiently located in the repository and retrieved. Next, these reference digests are loaded into memory, and instead of comparing data to find matches, the input digests and the loaded reference digests are matched.

The described embodiments provide a new fundamental approach for architecting a data deduplication system, which integrates a scalable two step approach of similarity search followed by a search of identical matching segments, with an efficient and cost effective digest/fingerprint based matching algorithm (instead of byte-wise data comparison). The digest/fingerprint based matching algorithm enables to read only a small fraction (1%) of the volume of data required by byte-wise data comparison. The present invention proposed herein, a deduplication system can provide high scalability to very large data repositories, in addition to high efficiency and performance, and reduced costs of processing and hardware.

In one embodiment, by way of example only, the term "similar data" may be referred to as: for any given input data, data which is similar to the input data is defined as data which is mostly the same (i.e. not entirely but at least 50% similar) as the input data. From looking at the data in a binary view (perspective), this means that similar data is data where most (i.e. not entirely but at least 50% similar) of the bytes are the same as the input data.

In one embodiment, by way of example only, the term "similar search" may be referred to as the process of searching for data which is similar to input data in a repository of data. In one embodiment, this process may be performed using a search structure of similarity elements, which is maintained and searched within.

In one embodiment, by way of example only, the term "similarity elements" may be calculated based on the data and facilitate a global search for data which is similar to input data in a repository of data. In general, one or more similarity elements are calculated, and represent, a large (e.g. at least 16 MB) chunk of data.

Thus, the various embodiments described herein provide various solutions for digest retrieval based on a similarity search in deduplication processing in a data deduplication system using a processor device in a computing environment. In one embodiment, by way of example only, input data is partitioned into fixed sized data chunks. Similarity elements, digest block boundaries and digest values are calculated for each of the fixed sized data chunks. Matching similarity elements are searched for in a search structure (i.e. index) containing the similarity elements for each of the fixed sized data chunks in a repository of data. Positions of similar data are located in a repository. The positions of the similar data are used to locate and load into the memory stored digest values and corresponding stored digest block boundaries of the similar data in the repository. It should be noted that in one embodiment the positions may be either physical or logical (i.e. virtual). The positions are of data inside a repository of data. The important property of a 'position' is that given a position (physical or logical) in the repository's data, the data in that position can be efficiently located and accessed. The digest values and the corresponding digest block boundaries are matched with the stored digest values and the corresponding stored digest block boundaries to find data matches.

Thus, the various embodiments described herein provide various solutions for digest retrieval based on a similarity search in deduplication processing in a data deduplication system using a processor device in a computing environment. In one embodiment, by way of example only, input data is partitioned into fixed sized data chunks. Similarity elements, digest block boundaries and digest values are calculated for each of the fixed sized data chunks. Matching similarity elements are searched for in a search structure (i.e. index) containing the similarity elements for each of the fixed sized data chunks in a repository of data. Positions of similar data are located in a repository. The positions of the similar data are used to locate and load into the memory stored digest values and corresponding stored digest block boundaries of the similar data in the repository. The digest values and the corresponding digest block boundaries are matched with the stored digest values and the corresponding stored digest block boundaries to find data matches In one embodiment, the present invention provides a solution for utilizing a similarity search to load into memory the relevant digests from the repository, for efficient deduplication processing. In a data deduplication system, deduplication is performed by partitioning the data into large fixed sized chunks, and for each chunk calculating (2 things—similarity elements and digest blocks/digest values) hash values (digest block/digest value) for similarity search and digest values. The data deduplication system searches for matching similarity values of the chunks in a search structure of similarity values, and finds the positions of similar data in the repository. The data deduplication system uses these positions of similar data to locate and load into memory stored digests of the similar repository data, and matching input and repository digest values to find data matches.

In one embodiment, the present invention provides for efficient calculation of both similarity search values and segmentation (i.e. boundaries) of digest blocks using a single linear calculation of rolling hash values. In a data deduplication system, the input data is partitioned into chunks, and for each chunk a set of rolling hash values is calculated. A single linear scan of the rolling hash values produces both similarity search values and boundaries of the digest blocks of the chunk. Each rolling hash value corresponds to a consecutive window of bytes in byte offsets. The similarity search values are used to search for similar data in the repository. The digest blocks segmentation is used to calculate digest block boundaries and corresponding digest values of the chunk, for digests matching. Each rolling hash value contributes to the calculation of the similarity values and to the calculation of the digest blocks segmentations. Each rolling hash value may be discarded after contributing to the calculations. The described embodiment provides significant processing efficiency and reduction of CPU consumption, as well as considerable performance improvement.

Thus, as described above, the deduplication approach of the present invention uses a two-step process for searching data patterns during deduplication. In the first step, a large chunk of incoming data (e.g. 16 megabytes "MB") is searched in the repository for similar (rather than identical) chunks of existing data, and the incoming chunk is partitioned accordingly into intervals, and paired with corresponding (similar) repository intervals. The similarity search structure (or "index") used in the first step is compact and simple to maintain and search within, because the elements used for a similarity search are very compact relative to the data they represent (e.g. 16 bytes representing 4 megabytes). Further included in the first step, in addition to a calculation of similarity elements, is a calculation of digest segments and respective digest values for the input chunk of data. All these calculations are based on a single calculation of rolling hash values. In the second step, reference digests of the similar repository intervals are retrieved, and then the input digests are matched with the reference digests, to identify data matches.

In one embodiment, in the similarity based deduplication approach as described herein, a stream of input data is partitioned into chunks (e.g. at least 16 MB), and each chunk is processed in two main steps. In the first step a similarity search process is applied, and positions of the most similar reference data in the repository are found. Within this step both similarity search elements and digest segments boundaries are calculated for the input chunk, based on a single linear calculation of rolling hash values. Digest values are calculated for the input chunk based on the produced segmentation, and stored in memory in the sequence of their occurrence in the input data. The positions of similar data are then used to lookup the digests of the similar reference data and load these digests into memory, also in a sequential form. Then, the input digests are matched with the reference digests to form data matches.

When deduplication of an input chunk of data is complete, the input chunk of data's associated digests are stored in the repository, to serve as reference digests for subsequent input data. The digests are stored in a linear form, which is independent of the deduplicated form by which the data these digests describe is stored, and in the sequence of their occurrence in the data. This method of storage enables efficient retrieval of sections of digests, independent of fragmentation characterizing deduplicated storage forms, and thus low on IO and computational resource consumption.

In addition, to solve the bottleneck problem as described above, in one embodiment, a deduplication system, as described herein, may use the two step approach for searching data patterns during deduplication. In the first step, a large chunk of incoming data (e.g. a few megabytes) is searched in the repository for similar (rather than identical) data chunks of existing data, and the incoming data chunk is partitioned accordingly into intervals and paired with corresponding (similar) repository intervals. In the second step, a byte-wise matching algorithm is applied on pairs of similar intervals, to identify identical sub-intervals, which are already stored in a repository of data. The similarity index used in this step is very compact and simple to maintain and search within, since the elements used for similarity search are very compact relative to the data they represent (e.g. 16 bytes representing 4 megabytes). Further included in the first step is a calculation of similarity characteristics as well as digest segments and respective digest values, of the input chunk of data. These calculations are based on a single calculation of rolling hash values. The matching algorithm of the second step relies on reading all the relevant similar data in the repository in order to compare it byte-wise to the input data. In the second step, reference digests of the similar repository intervals are retrieved, and then the input digests are matched with the reference digests, to identify data matches. This approach works very well on data sets where the generations of data have a low to moderate change rate (roughly up to 30% change rate) relative to previous generations. Such change rates are very typical for the most common use cases, and are specifically typical for data backup environments.

However, in the second step the existing matching algorithm searches for each individual input digest in the reference digests, which is a computationally intensive process. Another implication of the individual search is that relatively small data matches are produced, even in cases where such data matches are subsets of larger matches, which is inefficient in terms of storage considerations.

Due to the problem specified above, there is a need to design a digests matching algorithm that will reduce the number of digest search operations and will produce the largest possible data matches. This algorithm should also benefit from the fact that in the present invention digests are retrieved from the repository in a form that corresponds to their order of occurrence in the repository data.

In one embodiment, by way of example only, the present invention provides a digests matching algorithm that solves this problem, as well as benefits from the form in which digests are retrieved. The present invention provides considerable additional efficiency, both in computational and storage efficiency perspectives, that further enhances the performance and scalability of our similarity based deduplication approach.

In one embodiment, by way of example only, in the first step, as described herein, a similarity search process is applied on an input chunk of data (e.g. 16 MB), and the positions of the most similar reference data in the repository are found. Within this step both similarity search elements and digest segments boundaries are calculated for the input chunk, based on a single linear calculation of rolling hash values. Digest values are calculated for the input chunk based on the produced segmentation, and stored in a memory buffer in the sequence of their occurrence in the input data. The positions of similar data are then used to lookup the digests of the similar reference data. In one embodiment, the digests of the data contained in the repository are stored and retrieved in a form that corresponds to their occurrence in the data. Given a position and size of a section of data contained in the repository, its associated digests are efficiently located in the repository and retrieved. After the reference digests of the similar repository data are retrieved (and as the input digests are already calculated and available), the present invention, as described below, is initiated.

In one embodiment, the present invention loads the reference digests into two structures in memory: a buffer containing the digests sequentially in the order of their occurrence in the data, and a search structure, e.g. a hash table. Each digest value of the input chunk is searched in the search structure, and each candidate in the search structure, pointing into the buffer, is verified using the reference digest value and corresponding segment size. A match is declared only if both these values match. Each of the matches found is then extended forward and backward using the buffer of reference digests, until the matched sequence of digests cannot be further extended. The largest matched sequence is selected, and a data match, between the input and repository data, corresponding to the data covered by the matched digests sequence, is generated. If no match is found for the input digest, then the input data covered by that digest is determined to be not found in the repository, and a data mismatch is declared for that input data segment. The algorithm of the present invention then continues to process the next input digest, immediately following the currently matched sequence of input digests, or immediately following the currently mismatched input digest.

In one embodiment, for the dual data structures employed by the algorithm to store the reference digests—a sequential buffer (for extension of matches) and a search structure e.g. hash table (for efficient search of reference digests matching a given version digest), in a data deduplication system, matches of input and repository data are calculated by a digest based matching algorithm where the digests corresponding to a repository interval of data, identified as similar to a given input interval, are loaded into two memory structures: a sequential buffer containing a plurality of digests in the sequence of their occurrence in the data, and a search structure. An interval of data is specified by a starting position and size. A digest entry includes its value, and its segment's position and size in the data. In one embodiment, the search data structure may be a hash table. In one embodiment, storing repository digests in a sequential buffer may be used for extension of single matching digests into additional adjacent digests, and storing repository digests in a search structure may be used for efficient search of repository digests matching a given input digest.

In one embodiment, for utilization of the two data structures used by the algorithm, for finding matching digests and for extending matches with adjacent matching digests, in a data deduplication system, matches of input and repository data are calculated by a digest based matching algorithm where a repository digests corresponding to a repository interval of data, identified as similar to a given interval of input data, are loaded into a sequential representation and into a search structure, and for each digest match found in the search structure the match is extended using a sequential representation of the repository digests. An interval of data is specified by a starting position and size. A digest entry includes its value, and its segment's position and size in the data. In one embodiment, a search data structure may be a hash table. A sequential representation of repository digests may be a sequential buffer containing a plurality of repository digests, appearing in the sequence of their occurrence in the data. In one embodiment, input digests are searched in a search structure. An extension of a digest match is done by matching digests adjacent to an initial match in forward and backward directions, until a matched sequence of digests cannot be further extended. A largest matched sequence of matched sequences, is selected.

In one embodiment, for optimization where the hash table entries contain only a compact index (e.g. of 2 bytes) that points into a sequential buffer (instead of containing the complete digest information), the optimization makes the hash table very compact, and saves a considerable amount of memory. In one embodiment, in a data deduplication system, digests corresponding to an interval of repository data are loaded into two memory structures, a sequential representation and a search structure, and the entries of the search structure contain a compact index pointing into the sequential representation of digests. An interval of data is specified by a starting position and size. A digest entry in the sequential representation includes the digest value, and its segment's position and size in the data. In one embodiment, a search data structure may be a hash table. A sequential representation of repository digests may be a sequential buffer containing a plurality of repository digests, appearing in the sequence of their occurrence in the data.

In one embodiment, for optimization where information produced by a preliminary step of similarity search, consisting of already verified matching positions in the input and the repository intervals is used within a first step of extending matching digest sequences anchored at the aforementioned verified matching positions, before proceeding to a second step of finding further matches considering only the remaining unmatched input digests, in a data deduplication system, matches of input and repository data are calculated by a digest based matching algorithm, where in a first step digest matches, anchored at already verified matching positions in the input and repository data, are extended to create data matches, and in a second step the remaining unmatched input digests are matched. An interval of data is specified by a starting position and a size. The already verified matching positions may be produced by a prior step of similarity search. The first step includes comparing the digests at the anchor positions, and if their values and segment sizes match, then an extension of the match is applied forward and backward onto adjacent digests. A sequence of matching digests is extended onto adjacent digests until the sequence cannot be further extended. The second step includes searching for the input digests, which were not matched in the first step, in a hash table. A matching sequence of digests is recorded as a match of the input and repository intervals of data covered by the sequence of digests.

In one embodiment, the present invention stores reference digests in dual data structures in a digest based data matching process in a data deduplication system using a processor device in a computing environment. In one embodiment, by way of example only, a repository data interval is determined as similar to an input data interval. The reference digests corresponding to the repository data interval are loaded into dual data structures. The dual data structures include a sequential buffer containing multiple digest entries in a sequence of occurrence in data, and a search structure for searching of the reference digests matching an input digest.

In one embodiment, by way of example only, the present invention calculates data matches between input data and repository data in a data deduplication system using a processor device. A repository data interval is determined as similar to an input data interval. Repository digests corresponding to the similar repository data interval are loaded into a sequential representation and into a search structure. Matches of input digests and repository digests are found using the search structure. Each one of the found matches of the input digests and the repository digests are extended using the sequential representation. Data matches are found between the input data and the repository data using the extended matches of digests.

In one embodiment, by way of example only, the present invention optimizes a calculation of data matches between input data and repository data in a digest based data matching process in a data deduplication system using a processor device in a computing environment. A repository data interval is determined as similar to an input data interval. Repository digests corresponding to the similar repository data interval are loaded into a sequential representation and into a search structure. Digest matches are identified between input digests and the repository digests where the digest matches are located at anchored positions in input data and in repository data, and these digest matches are extended. The digest matches are calculated between remaining unmatched input digests and the plurality of repository digests. The data matches are determined between the input data and the repository data using the calculated matches of digests.

In one embodiment, by way of example only, the present invention optimizes a hash table structure for digest matching in a data deduplication system using a processor device in a computing environment. A repository data interval is determined as similar to an input data interval. Repository digests corresponding to the similar repository data interval are loaded into a sequential representation and into a search structure.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
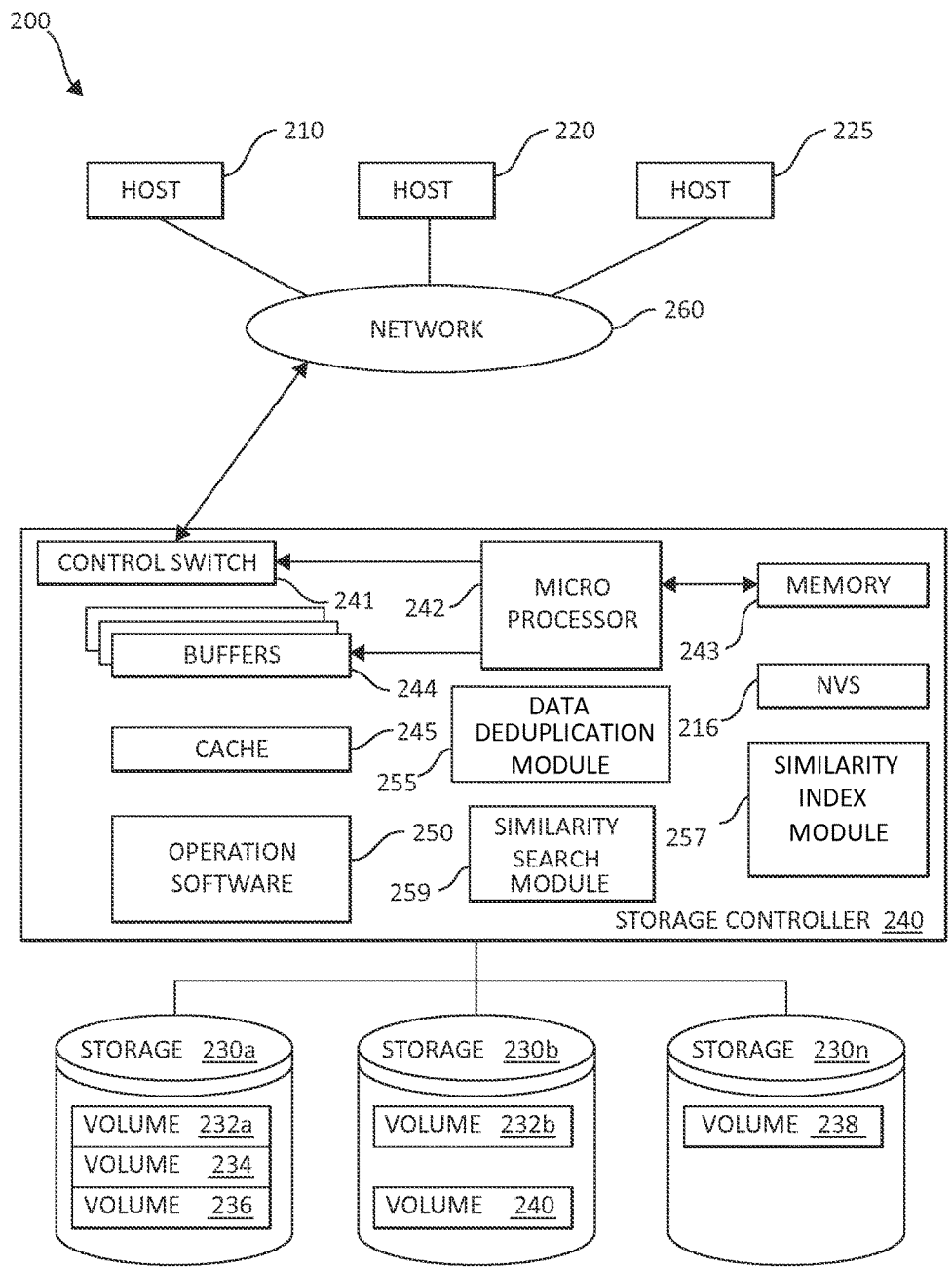
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Each of the hosts, 210, 220, and 225 may also be in communication and association with the storage controller 240. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a similarity index module 257 (e.g., a similarity search structure), and a similarity search module 259. The data duplication module 255, the similarity index module 257, and the similarity search module 259 may work in conjunction with each and every component of the storage controller 240, the hosts 210, 220, 225, and storage devices 230. The data duplication module 255, the similarity index module 257, and the similarity search module 259 may be structurally one complete module or may be associated and/or included with other individual modules. The data duplication module 255, the similarity index module 257, and the similarity search module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the similarity index module 257, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255, the similarity index module 257, and the similarity search module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255, the similarity index module 257, and the similarity search module 259 may also be located in the cache 245 or other components. As such, the data duplication module 255, the similarity index module 257, and the similarity search module 259 maybe used as needed, based upon the storage architecture and users preferences.

As mentioned above, in one embodiment, the input data is partitioned into large fixed size chunks (e.g. 16 MB), and a similarity search procedure is applied for each input chunk. A similarity search procedure calculates compact similarity elements, which may also be referred to as distinguishing characteristics (DCs), based on the input chunk of data, and searches for matching similarity elements stored in a compact search structure (i.e. index) in the repository. The size of the similarity elements stored per each chunk of data is typically 32 bytes (where the chunk size is a few megabytes), thus making the search structure storing the similarity elements very compact and simple to maintain and search within.

The similarity elements are calculated by calculating rolling hash values on the chunk's data, namely producing a rolling hash value for each consecutive window of bytes in a byte offset, and then selecting specific hash values and associated positions (not necessarily the exact positions of these hash values) to be the similarity elements of the chunk.

One important aspect and novelty provided by the present invention is that a single linear calculation of rolling hash values, which is a computationally expensive operation, serves as basis for calculating both the similarity elements of a chunk (for a similarity search) and the segmentation of the chunk's data into digest blocks (for finding exact matches). Each rolling hash value is added to the calculation of the similarity elements as well as to the calculation of the digest blocks segmentation. After being added to the two calculations, a rolling hash value can be discarded, as the need to store the rolling hash values is minimized or eliminated. This algorithmic element provides significant efficiency and reduction of CPU consumption, as well as considerable performance improvement.

In one embodiment, the similarity search procedure of the present invention produces two types of output. The first type of output is a set of positions of the most similar reference data in the repository. The second type of output is the digests of the input chunk, comprising of the segmentation to digest blocks and the digest values corresponding to the digest blocks, where the digest values are calculated based on the data of the digest blocks.

In one embodiment, the digests are stored in the repository in a form that corresponds to the digests occurrence in the data. Given a position in the repository and size of a section of data, the location in the repository of the digests corresponding to that interval of data is efficiently determined. The positions produced by the similarity search procedure are then used to lookup the stored digests of the similar reference data, and to load these reference digests into memory. Then, rather than comparing data, the input digests and the loaded reference digests are matched. The matching process is performed by loading the reference digests into a compact search structure of digests in memory, and then for each input digest, querying the search structure of digests for existence of that digest value. Search in the search structure of digests is performed based on the digest values. If a match is found, then the input data associated with that digest is determined to be found in the repository and the position of the input data in the repository is determined based on the reference digest's position in the repository. In this case, the identity between the input data covered by the input digest, and the repository data covered by the matching reference digest, is recorded. If a match is not found then the input data associated with that digest is determined to be not found in the repository, and is recorded as new data. In one embodiment, the similarity search structure is a global search structure of similarity elements, and a memory search structure of digests' is a local search structure of digests in memory. The search in the memory search structure of digests is performed by the digest values.

Figure 3:
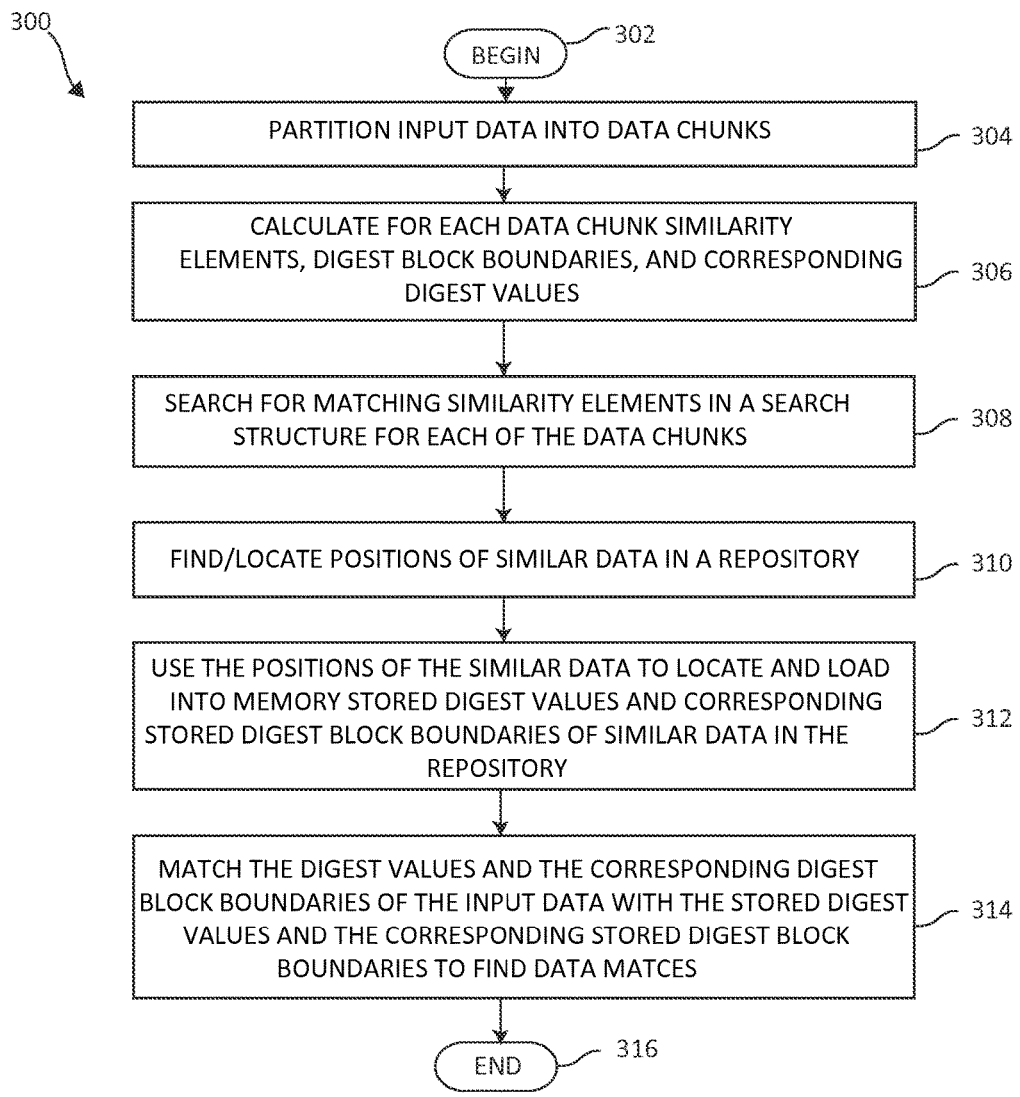
FIG. 3 is a flowchart illustrating an exemplary method for digest retrieval based on similarity search in deduplication processing in a data deduplication system in which aspects of the present invention may be realized.

FIG. 3 is a flowchart illustrating an exemplary method 300 for digest retrieval based on similarity search in deduplication processing in a data deduplication system in which aspects of the present invention may be realized. The method 300 begins (step 302). The method 300 partitions input data into data chunks (step 304). The input data may be partitioned into fixed sized data chunks. The method 300 calculates, for each of the data chunks, similarity elements, digest block boundaries, and corresponding digest values are calculated (step 306). The method 300 searches for matching similarity elements in a search structure (i.e. index) for each of the data chunks (which may be fixed size data chunks) (step 308). The positions of the similar data in a repository (e.g., a repository of data) are located (step 310). The method 300 uses the positions of the similar data to locate and load into memory stored digest values and corresponding stored digest block boundaries of the similar data in the repository (step 312). The method 300 matches the digest values and the corresponding digest block boundaries of the input data with the stored digest values and the corresponding stored digest block boundaries to find data matches (step 314). The method 300 ends (step 316).

Figure 4:
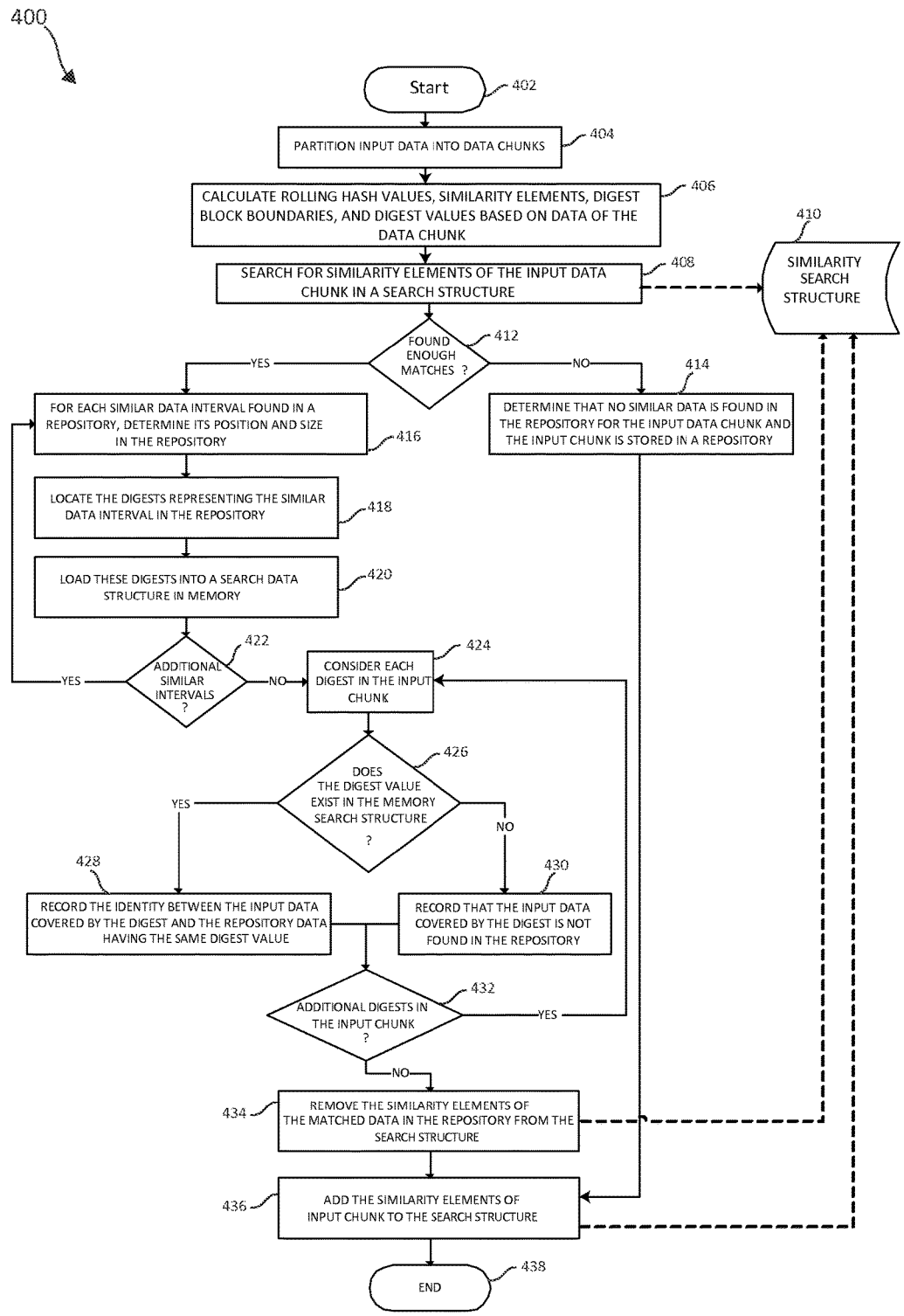
FIG. 4 is a flowchart illustrating an exemplary alternative method for digest retrieval based on similarity search in deduplication processing in a data deduplication system in which aspects of the present invention may be realized.

FIG. 4 is a flowchart illustrating an exemplary alternative method 400 for digest retrieval based on similarity search in deduplication processing in a data deduplication system in which aspects of the present invention may be realized. The method 400 begins (step 402). The method 400 partitions the input data into chunks (e.g., partitions the input data into large fixed size chunks) (step 404), and for an input data chunk calculates rolling hash values, similarity elements, digest block boundaries, and digest values based on data of the input data chunk (step 406). The method 400 searches for similarity elements of the input data chunk in a similarity search structure (i.e. index) (step 408 and 410). The method 400 determines if there are enough or a sufficient amount of matching similarity elements (step 412). If not enough matching similarity elements are found then the method 400 determines that no similar data is found in the repository for the input data chunk, and the data of the input chunk is stored in a repository (step 414) and then the method 400 ends (step 438). If enough similarity elements are found, then for each similar data interval found in a repository, the method 400 determines the position and size of each similar data interval in the repository (step 416). The method 400 locates the digests representing the similar data interval in the repository (step 418). The method 400 loads these digests into a search data structure of digests in memory (step 420). The method 400 determines if there are any additional similar data intervals (step 422). If yes, the method 400 returns to step 416. If no, the method 400 considers each digest of the input data chunk (step 424). The method 400 determines if the digest value exists in the memory search structure of digests (step 426). If yes, the method 400 records the identity between the input data covered by the digest and the repository data having the matching digest value (step 428). If no, the method 400 records that the input data covered by the digest is not found in the repository (step 430). From both steps 428 and 430, the method 400 determines if there are additional digests of the input data chunk (step 432). If yes, the method 400 returns to step 424. If no, method 400 removes the similarity elements of the matched data in the repository from the similarity search structure (step 434 and step 410). The method 400 adds the similarity elements of the input data chunk to the similarity search structure (step 436). The method 400 ends (step 438).

Figure 5:
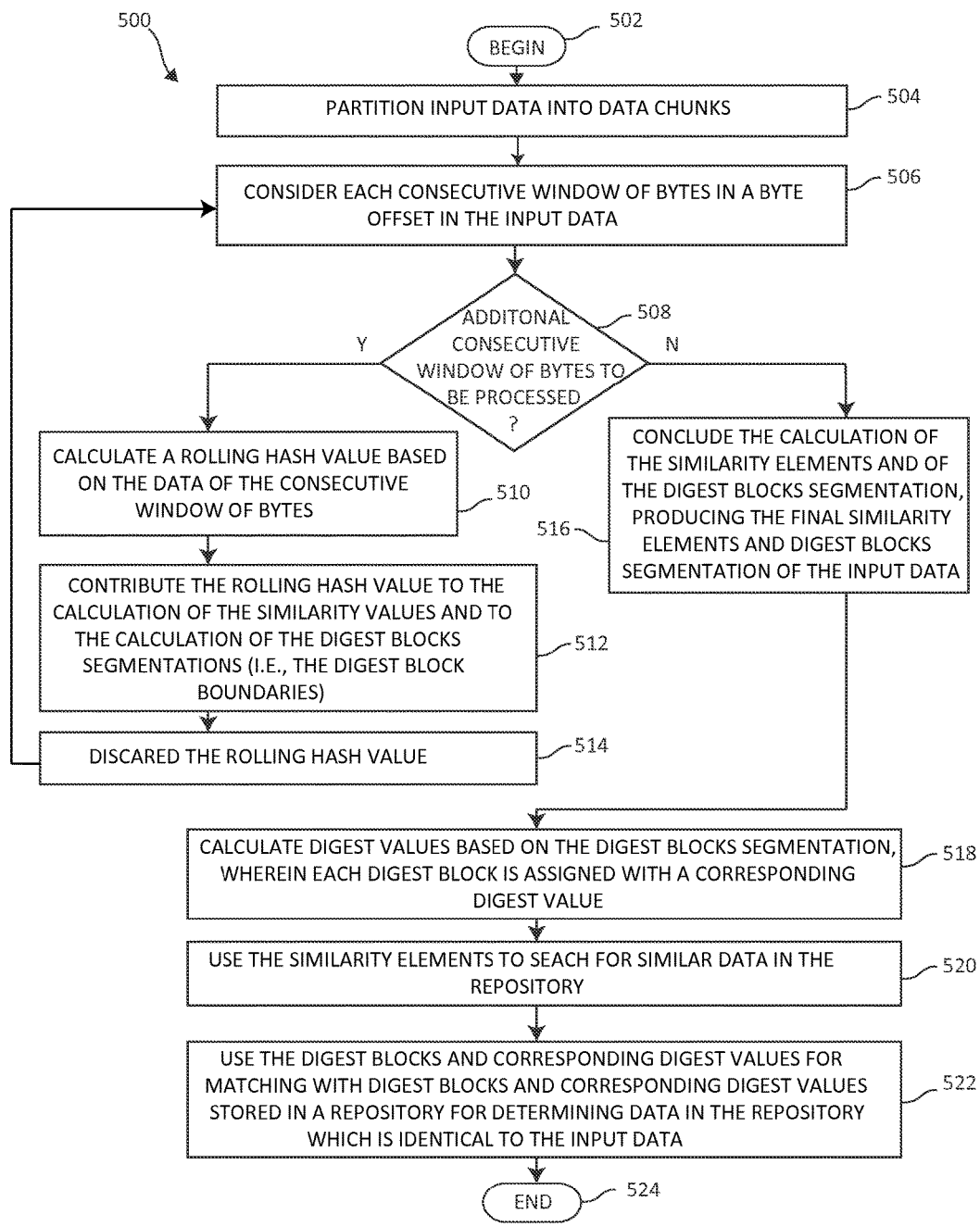
FIG. 5 is a flowchart illustrating an exemplary method for efficient calculation of both similarity search values and boundaries of digest blocks using a single linear calculation of rolling hash values in a data deduplication system in which aspects of the present invention may be realized.

FIG. 5 is a flowchart illustrating an exemplary method 500 for efficient calculation of both similarity search values and boundaries of digest blocks using a single linear calculation of rolling hash values in a data deduplication system in which aspects of the present invention may be realized. The method 500 begins (step 502). The method 500 partitions input data into data chunks (steps 504). The data chunks may be fixed sized data chunks. The method 500 considers each consecutive window of bytes in a byte offset in the input data (step 506). The method 500 determines if there is an additional consecutive window of bytes to be processed (step 508). If yes, the method 500 calculates a rolling hash value based on the data of the consecutive window of bytes (step 510). The method 500 contributes the rolling hash value to the calculation of the similarity values and to the calculation of the digest blocks segmentations (i.e., the digest block boundaries) (step 512). The method 500 discards the rolling hash value (step 514), and returns to step 506. If no, the method 500 concludes the calculation of the similarity elements and of the digest blocks segmentation, producing the final similarity elements and digest blocks segmentation of the input data (step 516). The method 500 calculates digest values based on the digest blocks segmentation, wherein each digest block is assigned with a corresponding digest value (step 518). The similarity elements are used to search for similar data in the repository (step 520). The digest blocks and corresponding digest values are used for matching with digest blocks and corresponding digest values stored in a repository for determining data in the repository which is identical to the input data (step 522). The method 500 ends (step 524).

Figure 6:
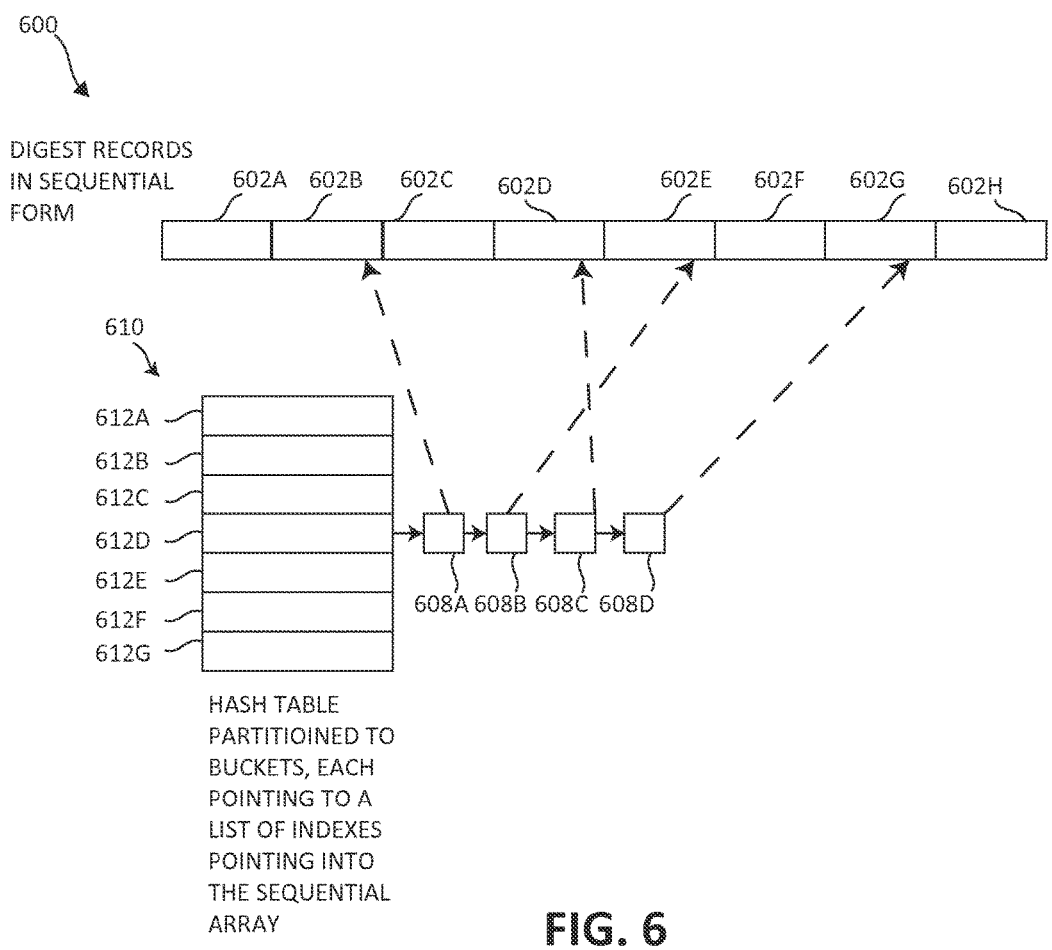
FIG. 6 is a block diagram illustrating data structures which aspects of the present invention may be realized.

FIG. 6 is a block diagram illustrating a memory structures which aspects of the present invention may be realized. In one embodiment, as described in FIG. 6, the global cache 600 consists of digest records 606 (shown in FIG. 6 as 606A-H) stored in a sequential form in the memory 600. The hash table 610 contains entries 612 (shown in FIG. 6 as 612A-G) that point to a list of indexes 608 that point into the digest records 606. In the hash table 610 entries 612 are included inside the hash table 612, where the entry 612 is linked to the entries list 608 of the table bucket where the digest value is hashed to. Each entry 612 consists of two compact indexes 608, one pointing to a digest record 606, and the second pointing to a digest entry position inside the digest record. The hash table 610 enables to efficiently search within the memories contents.

Figure 7:
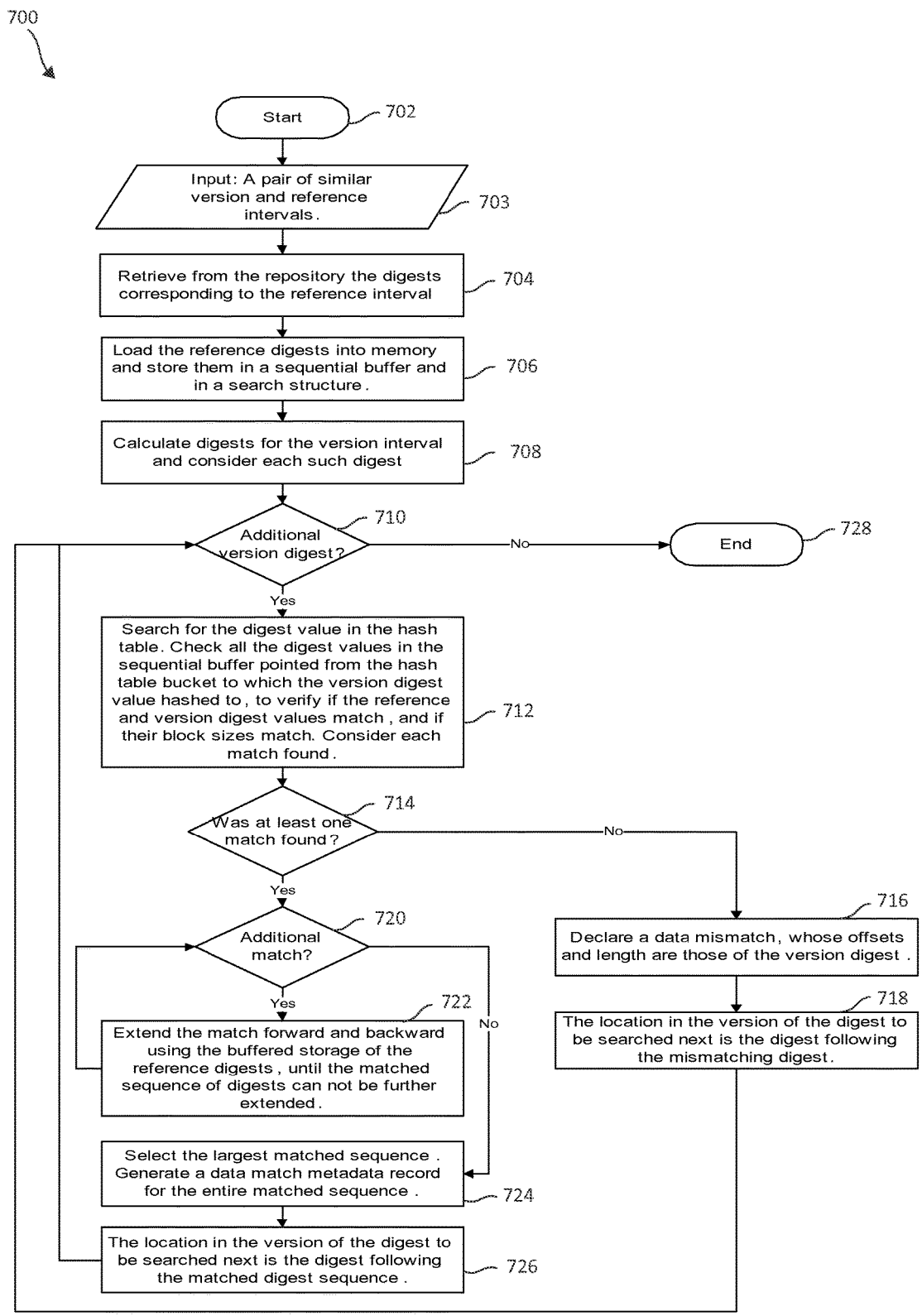
FIG. 7 is a flowchart illustrating an exemplary method for digest based data matching in similarity based deduplication in which aspects of the present invention may be realized.

FIG. 7 is a flowchart illustrating an exemplary method 700 for digest based data matching in similarity based deduplication in a data deduplication system in which aspects of the present invention may be realized. The method 700 begins (step 702). The method 700 includes inputs a pair of similar versions (step 703). Each interval is specified by a starting position and size. The method 700 retrieves from the repository the digests corresponding to the reference interval (step 704). The method 700 loads the reference digests into memory, and store them in two forms (see FIG. 6) (step 706). In one embodiment, a buffer contains the digests are stored sequentially in the order of their occurrence in the data. Each digest entry includes the digest value, and its segment's position and size in the data. A search structure may be a hash table. The method 700 calculates digests for the version interval and considers each such digest, and/or alternatively obtains the digests from a previous process, which already calculated these digests (step 708). These digests are stored in a memory buffer in the sequence of their occurrence in the input data. The method 700 determines if there are additional version digests (step 710). If no, the method ends (step 728). If yes, the method 700 searches for the digest value in the hash table, checks all digest values in the sequential buffer pointed from the hash table bucket to which the version digest value hashed to so as to verify if the reference and version digest values match and if their block sizes match, and also considers each data match found (step 712). In other words, for each digest value of the version, the value is searched in the hash table. All the digest values in the sequential buffer pointed from the hash table bucket to which the version digest value hashed to, are checked to verify if the reference and version digest values match, and if their segment sizes match. The method 700, the determines if there was at least one match is found (step 714). If at least one match is found, the method 700 determines if there are additional matches (step 720). If yes, for each of the found matches, the match is extended forward and backward using the buffered storage of the reference digests, until the matched sequence of digests cannot be further extended (step 722). If no, the largest matched sequence is selected (step 724). A data match metadata record is generated for the entire matched sequence. The method 700 searches the next location in the version of the digest following the matched digest sequence (step 726). The location in the version of the digest to be searched next is the digest following the matched digest sequence. A data match is determined by the start offset of the first matching digest in the sequence, and the data covered by all the matching digests in the sequence.

Returning to step 714, if at least one match is not found, the method 700 declares a data mismatch whose offsets and length are those of the version digest (step 716). If no match is found, a data mismatch is declared, whose offsets and length are those of the version digest. The method 700 searches the next location in the version of the digest following the mismatching digest (step 718). The location in the version of the digest to be searched next is the digest following the mismatching digest. From both step 718 and step 726, the method 700 returns to step 710.

In one embodiment, the present invention provides two main optimizations for the above algorithm, specified in the following. A first optimization is that the hash table shares memory storage with the sequential buffer. Specifically, a digest entry in the hash table can contain only a compact index pointing into the sequential buffer (e.g. assuming the buffer contains up to 64K digest entries, the index field size can be 2 bytes), instead of containing the complete digest information. A digest entry in the buffer contains the complete digest information, consisting of its value, and its segment's position and size. This optimization makes the hash table very compact, and saves a considerable amount of memory.

A second optimization is using information produced by a preliminary step of similarity search, that may consist of a number of already verified matching positions in the version and the reference intervals, but rather for byte-wise matching and not for digest matching). These positions, denoted as anchor positions, may have served as basis for determining that the version and reference intervals are similar. In the present invention, before step 710 of FIG. 7 in the above algorithm, the digests at the anchor positions are compared, and if matching and their segment sizes match, then these matches are extended forward and backward using the buffered storage of the reference digests, until the matched sequence of digests can not be further extended. Then each of these matched sequences is recorded as a data match, and the algorithm continues to step 710 of FIG. 7 by considering only the yet unmatched version digests.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for optimizing a calculation of data matches between input data and repository data in a digest based data matching process in a data deduplication system using a processor device in a computing storage environment, comprising:
partitioning an input data stream of input data into data chunks, the data chunks each having a size of at least 16 Megabytes (MB), and further partitioning the data chunks into input data intervals;
determining a repository data interval as similar to an input data interval to identify identical sub-intervals previously stored in a repository index, the repository index using similarity elements of at least 16 bytes representing 4 MB of data to identify the identical sub-intervals;
loading a plurality of repository digests corresponding to the similar repository data interval into a sequential representation corresponding to a placement order of calculated values of the plurality of similar repository digests and into a search structure, the placement order of the calculated values of the similar repository digests correlative to an order in which input digest values of the input data stream were individually calculated such that the plurality of repository digests are stored in the search structure based on a calculation time and order of when each of the input digests were first calculated when in un-deduplicated form, thereby storing the plurality of repository digests in a linear form independent of a deduplicated form by which the data the plurality of repository digests describe is stored;
identifying digest matches between input digests and the plurality of repository digests where the digest matches are located at a plurality of anchored positions in input data and in repository data, and extending the digest matches;
calculating the digest matches between remaining unmatched input digests and the plurality of repository digests; and
determining the data matches between the input data and the repository data using calculated matches of digests to identify duplicate data within the data deduplication system;
wherein the identified duplicate data of the data matches is eliminated such that only one copy of the identified duplicate data remains in the computing storage environment.

2. The method of claim 1, further including applying a similarity search process for determining the repository data interval as similar to the input data interval where the similarity search process provides the plurality of anchored positions in the input data and in repository data that is similar.

3. The method of claim 2, further including defining a digest match located at the plurality of anchored positions in the input data and in similar repository data as a pair of the input digest and one of the plurality of repository digests whose respective segments in the input data and in the repository data respectively contain a pair of anchored positions in the input data and in the repository data, and where digest values and segment sizes of the pair of the input digest and one of the plurality of repository digests match.

4. The method of claim 3, further including extending an anchored digest match in a forward direction and a backward direction onto adjacent matching digests until a sequence of matched input digests and the plurality of repository digests cannot be further extended.

5. The method of claim 1, further including performing one of:
searching for the plurality of repository digests matching the input digest using the search structure,
obtaining a plurality of digest matches, and
extending each one of the plurality of digest matches by matching additional input digests and an additional number of the plurality of repository digests which are adjacent to an initial match of digests in a forward direction and a backward direction until a sequence of matched input digests and the plurality of repository digests cannot be further extended.

6. The method of claim 5, further including selecting a largest sequence of matched input digests and the plurality of repository digests from a plurality of sequences of matched input digests and the plurality of repository digests.

7. The method of claim 1, further including performing one of:
   determining a data match between the input data and the plurality of repository digests based on the plurality of sequences of matched input digests and the plurality of repository digests by defining start positions of the data match as positions in the input data and in the plurality of repository digests of a first digest match in the plurality of sequences of matched input digests and the plurality of repository digests, and
   defining a size of the data match as a size of data covered by digest matches in the plurality of sequences of matched input digests and the plurality of repository digests.

8. A system for optimizing a calculation of data matches between input data and repository data in a digest based data matching process in a data deduplication system of a computing storage environment, the system comprising:
   the data deduplication system;
   a dual data structures in the data deduplication system, wherein the dual data structures include a search structure and a sequential buffer;
   a hash table included in the data deduplication system;
   a repository operating in the data deduplication system; and
   at least one processor device operable in the computing storage environment for controlling the data deduplication system, wherein the at least one processor device:
      partitions an input data stream of input data into data chunks, the data chunks each having a size of at least 16 Megabytes (MB), and further partitions the data chunks into input data intervals,
      determines a repository data interval as similar to an input data interval to identify identical sub-intervals previously stored in a repository index, the repository index using similarity elements of at least 16 bytes representing 4 MB of data to identify the identical sub-intervals,
      loads a plurality of repository digests corresponding to the similar repository data interval into a sequential representation corresponding to a placement order of calculated values of the plurality of similar repository digests and into the search structure, the placement order of the calculated values of the similar repository digests correlative to an order in which input digest values of the input data stream were individually calculated such that the plurality of repository digests are stored in the search structure based on a calculation time and order of when each of the input digests were first calculated when in un-deduplicated form, thereby storing the plurality of repository digests in a linear form independent of a deduplicated form by which the data the plurality of repository digests describe is stored,
      identifies digest matches between input digests and the plurality of repository digests where the digest matches are located at a plurality of anchored positions in input data and in repository data, and extending the digest matches,
      calculates the digest matches between remaining unmatched input digests and the plurality of repository digests, and
      determines the data matches between the input data and the repository data using calculated matches of digests to identify duplicate data within the data deduplication system;

wherein the identified duplicate data of the data matches is eliminated such that only one copy of the identified duplicate data remains in the computing storage environment.

9. The system of claim 8, wherein the at least one processor device applies a similarity search process for determining the repository data interval as similar to the input data interval where the similarity search process provides the plurality of anchored positions in the input data and in repository data that is similar.

10. The system of claim 9, wherein the at least one processor device defines a digest match located at the plurality of anchored positions in the input data and in similar repository data as a pair of the input digest and one of the plurality of repository digests whose respective segments in the input data and in the repository data respectively contain a pair of anchored positions in the input data and in the repository data, and where digest values and segment sizes of the pair of the input digest and one of the plurality of repository digests match.

11. The system of claim 10, wherein the at least one processor device extends an anchored digest match in a forward direction and a backward direction onto adjacent matching digests until a sequence of matched input digests and the plurality of repository digests cannot be further extended.

12. The system of claim 8, wherein the at least one processor device performs each of:
   searching for the plurality of repository digests matching the input digest using the search structure,
   obtaining a plurality of digest matches, and
   extending each one of the plurality of digest matches by matching additional input digests and an additional number of the plurality of repository digests which are adjacent to an initial match of digests in a forward direction and a backward direction until a sequence of matched input digests and the plurality of repository digests cannot be further extended.

13. The system of claim 12, wherein the at least one processor device performs selects a largest sequence of matched input digests and the plurality of repository digests from a plurality of sequences of matched input digests and the plurality of repository digests.

14. The system of claim 8, wherein the at least one processor device performs one of:
   determining a data match between the input data and the plurality of repository digests based on the plurality of sequences of matched input digests and the plurality of repository digests by defining start positions of the data match as positions in the input data and in the plurality of repository digests of a first digest match in the plurality of sequences of matched input digests and the plurality of repository digests, and
   defining a size of the data match as a size of data covered by digest matches in the plurality of sequences of matched input digests and the plurality of repository digests.

15. A computer program product for optimizing a calculation of data matches between input data and repository data in a digest based data matching process in a data deduplication system using a processor device in a computing storage environment, the computer program product comprising a non-transitory computer-readable storage medium having computer-readable program code portions stored therein, the computer-readable program code portions comprising:
   an executable portion that partitions an input data stream of input data into data chunks, the data chunks each having a size of at least 16 Megabytes (MB), and further partitions the data chunks into input data intervals;

an executable portion that determines a repository data interval as similar to an input data interval to identify identical sub-intervals previously stored in a repository index, the repository index using similarity elements of at least 16 bytes representing 4 MB of data to identify the identical sub-intervals;

an executable portion that loads a plurality of repository digests corresponding to the similar repository data interval into a sequential representation corresponding to a placement order of calculated values of the plurality of similar repository digests and into a search structure, the placement order of the calculated values of the similar repository digests correlative to an order in which input digest values of the input data stream were individually calculated such that the plurality of repository digests are stored in the search structure based on a calculation time and order of when each of the input digests were first calculated when in un-deduplicated form, thereby storing the plurality of repository digests in a linear form independent of a deduplicated form by which the data the plurality of repository digests describe is stored;

an executable portion that identifies digest matches between input digests and the plurality of repository digests where the digest matches are located at a plurality of anchored positions in input data and in repository data, and extending the digest matches;

an executable portion that calculates the digest matches between remaining unmatched input digests and the plurality of repository digests; and an executable portion that determines the data matches between the input data and the repository data using calculated matches of digests to identify duplicate data within the data deduplication system; wherein the identified duplicate data of the data matches is eliminated such that only one copy of the identified duplicate data remains in the computing storage environment.

16. The computer program product of claim 15, further including an executable portion that applies a similarity search process for determining the repository data interval as similar to the input data interval where the similarity search process provides the plurality of anchored positions in input data and in repository data that is similar.

17. The computer program product of claim 15, further including an executable portion that defines a digest match located at the plurality of anchored positions in the input data and in similar repository data as a pair of the input digest and one of the plurality of repository digests whose respective segments in the input data and in the repository data respectively contain a pair of anchored positions in the input data and in the repository data, and where digest values and segment sizes of the pair of the input digest and one of the plurality of repository digests match.

18. The computer program product of claim 17, further including an executable portion that extends an anchored digest match in a forward direction and a backward direction onto adjacent matching digests until a sequence of matched input digests and the plurality of repository digests cannot be further extended.

19. The computer program product of claim 15, further including an executable portion that performs each of:
searching for the plurality of repository digests matching the input digest using the search structure,
obtaining a plurality of digest matches, and
extending each one of the plurality of digest matches by matching additional input digests and an additional number of the plurality of repository digests which are adjacent to an initial match of digests in a forward direction and a backward direction until a sequence of matched input digests and the plurality of repository digests cannot be further extended.

20. The computer program product of claim 19, further including an executable portion that performs selects a largest sequence of matched input digests and the plurality of repository digests from a plurality of sequences of matched input digests and the plurality of repository digests.

21. The computer program product of claim 15, further including an executable portion that performs one of:
determining a data match between the input data and the plurality of repository digests based on the plurality of sequences of matched input digests and the plurality of repository digests by defining start positions of the data match as positions in the input data and in the plurality of repository digests of a first digest match in the plurality of sequences of matched input digests and the plurality of repository digests, and
defining a size of the data match as a size of data covered by digest matches in the plurality of sequences of matched input digests and the plurality of repository digests.

* * * * *